United States Patent [19]
Cole

[11] Patent Number: 4,524,893
[45] Date of Patent: Jun. 25, 1985

[54] BICYCLE CARRIER

[75] Inventor: Stephen J. Cole, Arcata, Calif.

[73] Assignee: Yakima, Inc., Arcata, Calif.

[21] Appl. No.: 648,950

[22] Filed: Sep. 10, 1984

[51] Int. Cl.³ .............................................. B60R 9/10
[52] U.S. Cl. ..................................... 224/319; 211/5;
224/42.03 B
[58] Field of Search ................. 224/319, 42.03 B, 309,
224/42.19, 42.42, 42.06, 42.45 R; 211/5

[56] References Cited

U.S. PATENT DOCUMENTS

| | | | |
|---|---|---|---|
| 3,901,421 | 8/1975 | Kalicki et al. | 224/42.03 B X |
| 3,944,079 | 3/1976 | Boslough | 211/5 |
| 4,015,718 | 4/1977 | Bernard | 211/5 |
| 4,126,228 | 11/1978 | Bala et al. | 211/5 |
| 4,352,363 | 10/1982 | Wilson | 211/5 X |
| 4,386,709 | 6/1983 | Graber | 224/42.03 B X |
| 4,442,961 | 4/1984 | Bott | 224/42.03 B |

FOREIGN PATENT DOCUMENTS

| | | | |
|---|---|---|---|
| 104714 | 6/1942 | Sweden | 224/42.03 B |
| 129225 | 8/1950 | Sweden | 224/42.03 B |

Primary Examiner—Stephen Marcus
Assistant Examiner—Robert Petrik
Attorney, Agent, or Firm—Robert Charles Hill

[57] ABSTRACT

A car top bicycle carrier in which a bicycle is supported in an upright, fully assembled position. There is a generally V-shaped trough into which the bicycle tires are placed and one or more straps for retaining the tires in the trough. A U-shaped stanchion is provided with a clamping mechanism for clamping the upper part of one of the bicycle wheels so as to retain the bicycle in an upright position and against movement longitudinally of the trough. The clamping mechanism can be adapted to bicycles with relatively large wheels and to bicycles with relatively small wheels.

6 Claims, 6 Drawing Figures

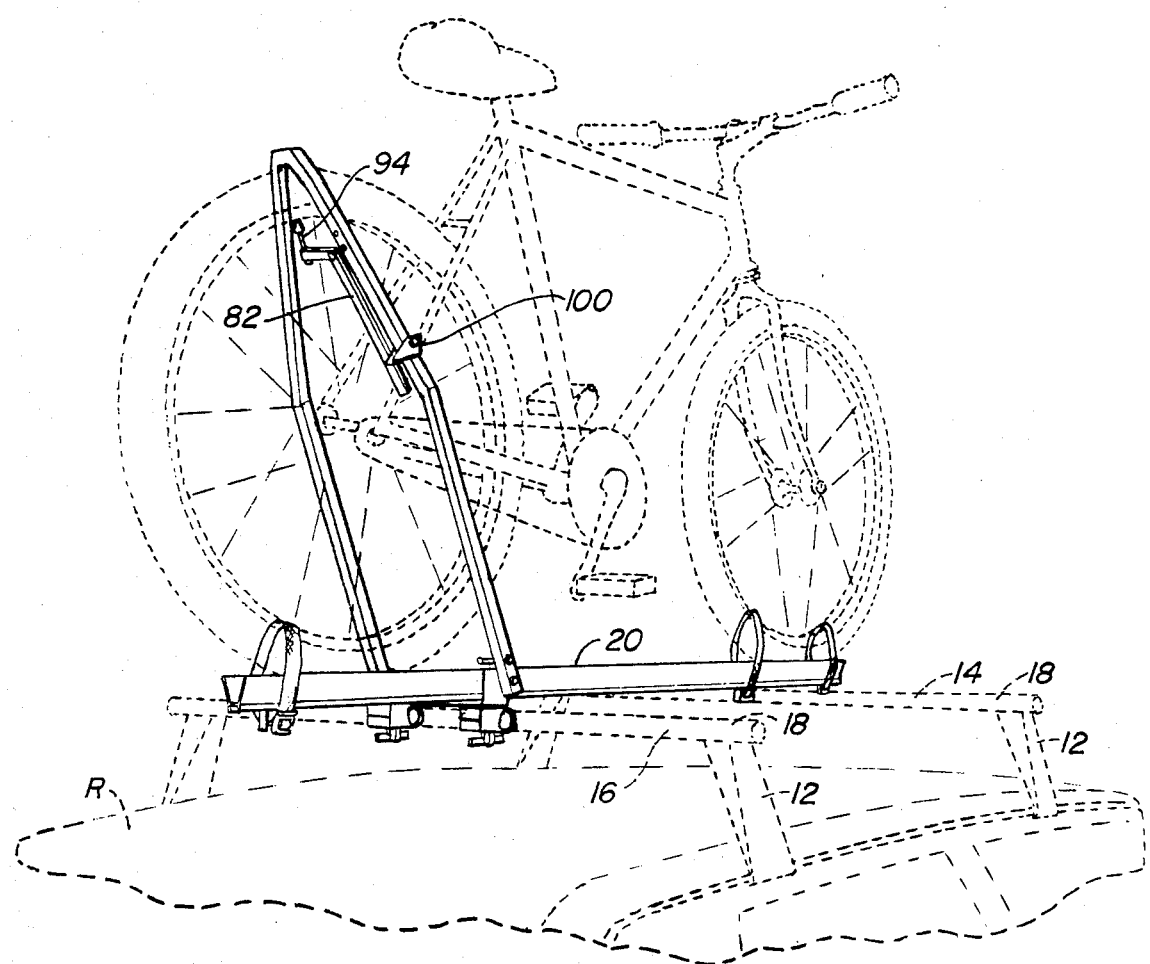
FIG.—1.
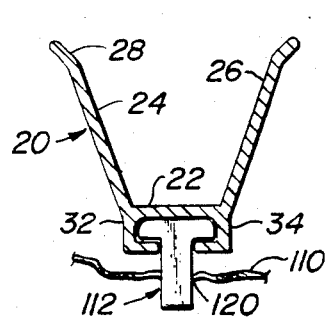
FIG.—3.
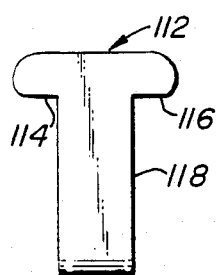
FIG.—4.
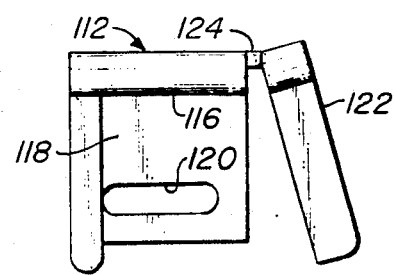
FIG.—5.
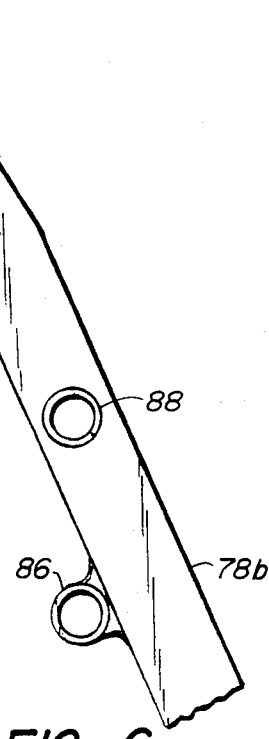
FIG.—6.

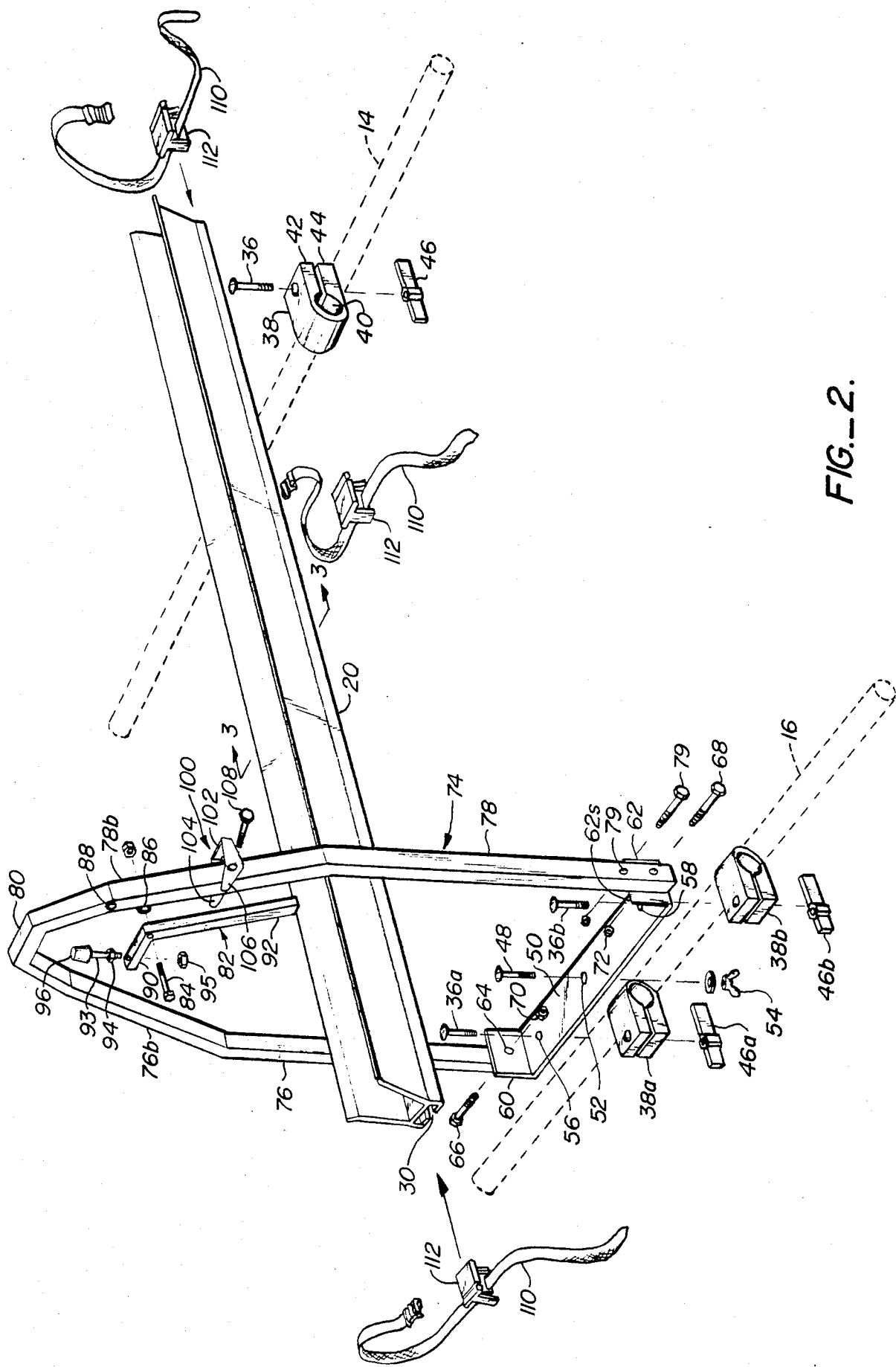
FIG._2.

BICYCLE CARRIER

BACKGROUND OF THE INVENTION

1. Field of the Invention

This invention relates to a bicycle carrier of the type typically mounted on the roof of an automobile and more particularly to such carrier that supports the bicycle in an upright position.

2. Description of the Prior Art

U.S. Pat. No. 3,901,421 discloses a bicycle rack having V-shaped channels in which the wheels of bicycles can be supported. Extending upward are clamp members which clamp a region of the tubular frame to retain the bicycle within the channel during transport. U.S. Pat. Nos. 3,581,962; 3,828,993 and 3,848,784 also disclose bicycle carriers in which the bicycle is supported in an upright condition. The latter two patents require removal of the front bicycle wheel before the bicycle is secured to the carrier.

U.S. Pat. Nos. 3,204,839; 3,931,919 and 4,219,142 disclose bicycle carriers in which a bicycle is supported in an inverted position.

SUMMARY OF THE INVENTION

A bicycle carrier embodying the present invention is particularly suitable for, but not limited to, carrying all terrain bicycles which are characterized by having relatively large rims and tires, no fenders, and numerous accessories such as water bottles and air pumps. Typically such bicycles are ruggedly constructed and not arranged for rapid disassembly as are certain racing bicycles.

A carrier according to the invention includes a generally V-shaped trough or track and suitable mounting hardware for supporting the track in a substantially horizontal position on an automobile roof. The trough has sufficient length to support the front and rear wheels of the bicycle. There are flexible straps provided for fixing the wheels within the trough and rigid with one end of the trough is a pivotally mounted U-shaped member or stanchion that has a dimension somewhat larger than the diameter of the rear wheel. The U-shaped member is provided with a clamping mechanism for clamping the rear wheel and the rim of the bicycle to afford both lateral and longitudinal support to the bicycle.

An object of the present invention is to provide a bicycle carrier which affords quick mounting and dismounting of a bicycle supported thereon. This object is achieved by constructing the clamping mechanism associated with the above mentioned U-shaped member so that it is both positive in its clamping action and capable of rapid engagement and disengagement.

Another object is to provide a bicycle carrier that is capable of supporting bicycles of different wheel diameters. This object is achieved by providing plural sites for mounting the above mentioned clamping mechanism. In the specific embodiment described hereinafter there are two such sites, one for 27 inch diameter wheel and one for 26 inch diameter wheel.

Still another object of the invention is to provide a bicycle carrier that can accommodate bicycles of differing longitudinal dimensions. This object is achieved in part by forming the V-shaped wheel supporting channel as an extrusion having in its lower extremity a continuous slot. Sliders are disposed in the slot and straps which circumscribe the bicycle tires and rims are engaged with the sliders. In the absence of tension on the straps, the sliders can be longitudinally positioned within the slot but when the strap is tensioned the sliders are substantially immovably supported within the slot.

The foregoing, together with other objects, features and advantages, will be more apparent after referring to the following specification and the accompanying drawings.

BRIEF DESCRIPTION OF THE DRAWINGS

FIG. 1 is a perspective view of a carrier according to the invention in its operative condition.

FIG. 2 is an exploded view of the bicycle carrier of FIG. 1.

FIG. 3 is a cross-sectional view of a wheel trough according to the invention taken substantially along line 3—3 of FIG. 2.

FIG. 4 is an end view of a strap retainer slide according to the invention.

FIG. 5 is a side view of the strap retainer slide of FIG. 4.

FIG. 6 is a fragmentary view, at enlarged scale, of a portion of the carrier.

DETAILED DESCRIPTION OF A PREFERRED EMBODIMENT

Referring more particularly to the drawing, reference characer R indicates the roof of an automobile along each side edge of which is a lip, one of which is seen at L. Secured to lips L are conventional mounting brackets 12 which are standard items of commerce and are not per se novel. There is a pair of forward mounting brackets and a pair of rearward mounting brackets. Spanning each pair of mounting brackets is a tubular crossbar, there being a front crossbar 14 and a rear crossbar 16. Mounting brackets 12 have clamp straps 18 which tightly embrace opposite ends of the crossbars to retain the crossbars rigidly in place on roof R. A generally V-shaped wheel receiving trough 20 is supported between crossbars 14 and 16; the trough extends longitudinally of the automobile.

As seen most clearly in FIG. 3, trough 20 includes a horizontally extending bottom web 22 from opposite edges of which side webs 24 and 26 extend upwardly in a diverging or generally V-shaped configuration. The upper extremities of the side edges are flared as at 28 to facilitate introduction of a bicycle tire into the trough. The width of bottom web 22 and the angle of divergence of side webs 24 and 26 are established so as to receive the bicycle tire within the trough and retain frictional contact between the side walls of the tire and side webs 24 and 26.

Integral with and extending downward from bottom web 22 are L-shaped members 32 and 34 which cooperate to define a slot 30 which opens toward the bottom of trough 20.

A mounting bolt 36 slides within slot 30 at the forward end of trough 20. The portion of bolt 36 that extends below the trough is received in a clamp bracket 38 which is made of elastic material such as nylon or the like. The clamp bracket defines a generally cylindric hole 40 that has an inner diameter corresponding to the outer of crossbar 14. Clamp bracket 38 is split to form an upper plate 42 and a lower plate 44. Plates 42 and 44 are drilled to receive bolt 24 therethrough and there is a nut 46 adapted for threaded engagement with bolt 24.

When nut 46 is tightened, plates 42 and 44 are drawn toward one another so that the wall defining bore 40 firmly grips crossbar 14.

A mounting bolt 48 slides within slot 30 at the rear extremity of trough 20 to fix the trough to a base bracket 50, the base bracket 50 having a hole 52 through which the lower end of bolt 48 passes. A nut 54 is provided for threadedly engaging the protruding portion of bolt 48 to secure trough 20 to the base bracket 50.

Base bracket 50 is secured to crossbar 16 with hardware similar to that employed to fasten the front extremity of the tray to crossbar 14. More particularly there are bolts 36a and 36b which extend through holes 56 and 58 in base bracket 50. The portions of bolts 36a and 36b that protrude below the base bracket are engaged with clamp brackets 38a and 38b which are identical to clamp bracket 38 and therefore will not be further described in detail. The brackets envelope crossbar 16 and are compressed onto the crossbar by nuts 46a and 46b so that base bracket 50 and the rear end of trough 20 are firmly secured to crossbar 16.

Base bracket 50 at its opposite lateral extremities is provided with integral upstanding pivot plates 60 and 62. The pivot plates are formed with horizontally aligned holes, one of which is seen in FIG. 2 at 64 and through which pivot bolts 66 and 68 extend. Nuts 70 and 72 are provided for retaining the respective pivot bolts in place.

Pivot bolts 66 and 68 function to mount to base bracket 50 a hoop or stanchion 74. Stanchion 74 is of generally inverted U-shape and has depending legs 76 and 78 at the lower extremities of which are formed holes through which pivot bolts 66 and 68 extend so as to mount stanchion 74 to the base bracket for pivotal movement around a horizontal axis that is oriented transversely of trough 20. Above the hole through which bolt 68 extends, depending leg 78 is provided with a hole 79 in which a bolt 79b is fixed. Bolt 79b projects from the inner surface of leg 78 so that a portion of the bolt contacts upper edge surface 62s of pivot plate 62, thereby to limit the rearward most pivotal position of stanchion 74. The upper portions of legs 76 and 78 have inward bent portions 76b and 78b, and the upper extremities of the latter portions are rigidly joined to one another by a crosspiece 80.

Crosspiece 80 has a horizontal dimension such that the inner surfaces of the top of bent portions 76b and 78b are spaced from one another by a distance such as to frictionally engage a bicycle tire disposed therebetween. The overall height of stanchion 78, i.e. the distance from the axis of the holes through which pivot bolts 66 and 68 pass to the lower or inner surface of crosspiece 80, is greater than the diameter of a typical bicycle wheel such that the stanchion can reside in a sloped or non-vertical position when it is engaged with the rear wheel of a bicycle.

Mounted to stanchion 74 is a rear wheel clamping mechanism that includes a generally L-shaped lever 82 which is mounted to inward bent portion 78b of the stanchion by means of a clamp pivot bolt 84. The stanchion is provided with a lower pivot bushing 86 and an upper pivot bushing 88. The pivot bushings are vertically aligned with one another. Pivot bolt 94 is engaged in lower bushing 86 when the device is used to carry bicycles with relatively small wheel diameters (e.g. 26 inches) and is engaged in upper bushing 88 when the carrier is used to transport bicycles with relatively large wheels (e.g. 27 inches).

Clamp lever 82 includes a horizontally extending leg 90 and a generally vertically extending leg 92. The angle between the two legs corresponds to the angle between crosspiece 80 and bent portion 76b so that when leg 90 is disposed in a horizontal position, leg 92 lies along and substantially parallel to the bent portion. The distal end of horizontal leg 90 is formed with an opening to receive a threaded bolt 93 therethrough. An upper adjusting nut 94 and a lower locking nut 95 are provided so that bolt 93 can be positioned and locked at any range within its length. Consequently the interval or space between the upper end of the bolt 93 and the lower surface of crosspiece 80 can be adjusted. The upper end of bolt 93 is provided with a high friction clamping piece 96 made of such material as rubber; the clamping piece is adapted to engage the inner surface of the bicycle wheel rim in a firm manner without marring the finish on the rim.

Mounted to bent portion 78 below pivot bushing 88 is a clamp lever stop 100. Clamp lever stop 100 is of generally U-shaped configuration and has a cross member 102 from the opposite ends of which side legs 104 and 106 extend. The side legs are formed with coaxial bores through which a stop pivot bolt 108 extends, a hole being provided in bent portion 78b for receiving the bolt so that lever stop 100 is pivotally movable. Cross member 102 of the stop forms a finger grip so that stop 100 can be moved between an extended position at which the distal extremities of the side legs reside forward of the rear surface of the bent portion so as to afford free pivotal movement of lever 82. A spring, not shown, is provided for resiliently biasing the stop to the exteded position.

One or more straps 110 are provided for retaining the bicycle wheels against movement in trough 20. A strap slider 112 is provided for engaging the strap at any point along trough 20. As seen most clearly in FIG. 4, strap slider 112 has a generally T-shaped cross section and includes lateral extending portions 114 and 116 from which a central portion 118 depends. Laterally extending portions 114 and 116 are dimensioned to reside in the space defined between the L-shaped members. In the region of depending portion 118 that extends below trough 20 a strap retaining slot 120 is defined. Strap 110 passes through the slot.

In order to adapt a carrier according to the invention for different sized bicycles, it is desirable that sliders 112 be positionable at any desired locaton throughout the longitudinal extent of trough 20. It is also desirable that once the slider is positioned at a desired location that it not move from the location. For achieving these desiderata there is at one end of slider 112 a hinged retainer portion 122. Slider is preferably formed of synthetic resinous material, such as nylon or the like, which has adequate strength and a degree of resilience. The slider has a hinge portion 124 which joins retainer 122 to the main body of the slide. Hinge 124 is thin enough to afford hinged movement of retainer 122 between oblique position seen in FIG. 5 and a position at which the retainer lies substantially parallel to the confronting face of the main body of slide 112. Slide 112 is molded so that retainer 122 is biased toward the oblique position seen in FIG. 5, at which the slide is substantially locked against movement along the slot in trough 20, and can assume a position at which retainer 122 lies parallel to the main body of the slider. In the latter position, the slider can be easily moved along trough 122 to the desired position. In the former position, the upper portions of retainer 122 frictionally engage the inner surfaces of the slot in trough 20 to prevent movement of the retainer.

In FIG. 1 it will be noted that there are two straps 110 circumscribing the front wheel of the bicycle and one strap circumscribing te rear wheel of the bicycle, each such strap being joined to an individual slide 112. Because the opposite ends of the slot in trough 120 are open, slides 112 can be introduced into or removed from the slot in the trough should a greater or lesser number of straps and slides be needed to secure the bicycle.

In utilizing the structure for mounting a bicycle for transport in the carrier, lever 82 is mounted in the appropriate pivot bushing 86, 88 depending on the diameter of the rear wheel. Next the position of clamping bolt 93 is adjusted by manipulation of nuts 94 and 95 so that clamping piece 96 resides at a distance from the lower surface of crosspiece 80 when lever 82 is engaged by stop 100 such that the wheel and rim are firmly engaged between the crosspiece and the clamping piece. Because the clamping piece is made of rubber or the like and because the vehicle tire has a degree of compressibility, a firm grip on the rear bicycle wheel can be achieved. Next the bicycle is manipulated into place in trough 20. Lever stop 100 is retracted so that lever 82 can be moved to position clamping piece 96 away from the vehicle rim. Stanchion 74 is then pivoted into a position such as seen in FIG. 1 at which the lower surface of crosspiece 80 rests on the top of the rear vehicle wheel. Then lever 82 is manipulated so that clamping piece 96 engages the vehicle rim so as to securely retain the wheel and rim between the crosspiece and the clamping piece. Lever stop is moved to the extended position to retain the lever as described in the preceding sentence. Finally a suitable number of straps are engaged with the front and rear vehicle wheels and the bicycle is thus firmly fixed for transport.

Thus, it will be seen that the present invention provides a car top bicycle carrier which facilitates placement of a bicycle against movement during transport. Because stanchion 74 is pivotable and because lever 82 can be mounted at a plurality of vertical locations, the carrier can be adapted to support different sized bicycles.

Although one embodiment of the invention has been shown and described, it will be obvious that other adaptations and modifications can be made without departing from the true spirit and scope of the invention.

What is claimed is:

1. A car top carrier for a bicycle comprising an elongate rigid V-shaped channel adapted to receive the bicycle tires therein, means for mounting the channel on a car top in a substantially horizontal position oriented longitudinally of the car, a generally U-shaped stanchion including a pair of depending stanchion legs that have lengths approximately the diameter of the bicycle tire, means for attaching the lower extremities of respective said stanchion legs to said channel for pivotal movement about an axis substantially transverse to the channel, the upper portions of said stanchion legs being joined to one another by a crosspiece to space the upper portion of said stanchion legs apart from one another by a distance approximating the width of a bicycle tire, a clamping lever pivotally mounted on one of said stanchion legs and having a first portion that extends inward from said stanchion leg and confronts the crosspiece across an interval greater than the radial extent of the bicycle tire and rim, said clamping lever having a second portion rigid with the first portion and angularly oriented with respect thereto so that when the first portion is in a generally horizontal position said second portion resides substantially parallel to said stanchion leg, means for releasably locking said second portion into substantially parallel relation to said stanchion leg, and a clamping member secured to the distal region of said first portion of said lever, said clamping member including a high friction clamping piece for engaging the inner radial extremity of the bicycle rim and means for positioning the high friction member toward and away from the rim so that the rim and tire can be clamped between the crosspiece and the high friction member, said clamping member being releasable by disengaging said locking means and pivoting said clamping lever to move said clamping piece away from the bicycle rim.

2. A car top carrier in accordance with claim 1 wherein said first portion of said clamping lever defines a bore in substantial alignment with the midpoint of said crosspiece when said clamping lever is in said first position, a bolt extending through said bore, means for adjustably fixing the longitudinal position of said bolt with respect to said first clamping lever portion, said high friction clamping piece being fixed to a longitudinal extremity of said bolt.

3. A car top carrier in accordance with claim 1 wherein said locking means comprises a generally U-shaped stop member having a base leg and two side legs extending perpendicularly from opposite extremities of said base leg, said base leg having a length greater than the thickness of said stanchion leg so that said side legs can reside in flanking relation to said stanchion leg, means including a pivot bolt transpiercing a medial region of said legs and said stanchion leg for mounting said U-shaped member to said stanchion leg for pivotal movement between an extended position at which the ends of said side legs remote from said cross leg project from said stanchion leg and a retracted position so that in the extended position said second portion of said clamping lever resides between said side legs to retain the first portion of said clamping lever in confronting relation to said crosspiece.

4. A car top carrier in accordance with claim 3 including upper and lower pivot bushings fixed to said stanchion leg for receiving said pivot bolt, said bushings being in substantial vertical alignment, said pivot bolt being engageable in either of said pivot bushings to afford installation of said clamping lever at a selected vertical position on said stanchion leg.

5. A car top carrier according to claim 1 wherein said channel includes laterally opposed L-shaped members rigid therewith and depending therefrom to define a longitudinally extending slot co-extensive with said channel, at least one slide for disposition in said slot, said slide having a generally T-shaped cross section and having upper arms adapted for sliding engagement with the inner surfaces defined by said L-shaped members, said slide having a plate integral with and depending from said arms and defining an opening therethrough that is positioned exterior of said slot, and a strap adapted to extend through said opening for circumscribing the rim and tire of said bicycle at a point along said channel.

6. A car top carrier in accordance with claim 5 wherein said slide includes a main body, a T-shaped retainer, and a hinge portion for joining said retainer to said body for hinged movement relative thereto, said hinge portion biasing said retainer to an oblique position so as to bias said retainer into frictional contact with the walls of said L-shaped portions that define said slot to restrict said slide against longitudinal movement in said slot.

* * * * *